(12) United States Patent
Rajasingham

(10) Patent No.: US 7,091,928 B2
(45) Date of Patent: Aug. 15, 2006

(54) INTELLIGENT EYE

(76) Inventor: Arjuna Indraeswaran Rajasingham, 6024 Bradley Blvd., Bethesda, MD (US) 20817

( * ) Notice: Subject to any disclaimer, the term of this patent is extended or adjusted under 35 U.S.C. 154(b) by 636 days.

(21) Appl. No.: 09/796,540

(22) Filed: Mar. 2, 2001

(65) Prior Publication Data
US 2002/0122014 A1  Sep. 5, 2002

(51) Int. Cl.
*G09G 5/00* (2006.01)
(52) U.S. Cl. .................. 345/7; 345/8; 345/9; 345/156
(58) Field of Classification Search ............... 345/6, 345/7, 8, 688, 9, 156; 359/630; 348/51, 348/52, 53, 54, 55, 56, 57, 58, 59, 69
See application file for complete search history.

(56) References Cited

U.S. PATENT DOCUMENTS

| | | | | |
|---|---|---|---|---|
| 4,287,410 A | * | 9/1981 | Crane et al. ............ 250/201.4 |
| 4,373,787 A | * | 2/1983 | Crane et al. ................ 351/210 |
| 5,481,622 A | * | 1/1996 | Gerhardt et al. ............ 382/103 |
| 5,583,795 A | * | 12/1996 | Smyth ........................ 702/150 |
| 5,751,260 A | * | 5/1998 | Nappi et al. ................... 345/8 |
| 6,198,462 B1 | * | 3/2001 | Daily et al. .................... 345/8 |
| 6,201,517 B1 | * | 3/2001 | Sato .............................. 345/7 |
| 6,204,850 B1 | * | 3/2001 | Green ........................ 715/850 |
| 6,396,497 B1 | * | 5/2002 | Reichlen ..................... 345/427 |
| 6,421,064 B1 | * | 7/2002 | Lemelson et al. .......... 345/688 |
| 6,560,028 B1 | * | 5/2003 | Melville et al. ............ 359/630 |
| 6,580,448 B1 | * | 6/2003 | Stuttler ........................ 348/46 |
| 6,618,054 B1 | * | 9/2003 | Deering ....................... 345/581 |
| 6,659,611 B1 | * | 12/2003 | Amir et al. ................. 351/210 |

* cited by examiner

*Primary Examiner*—Richard Hjerpe
*Assistant Examiner*—Jean Lesperance (57) ABSTRACT

A new approach for visual man-machine interaction that mimics the human response to natural visual information by instructing the computer with eye and ocular appendages. The system may also be used to uniquely identify the user.

16 Claims, 2 Drawing Sheets

Figure 1

INTELLIGENT EYE

CROSS REFERENCE TO RELATED APPLICATIONS

Not applicable

STATEMENT REGARDING FEDERALLY SPONSORED RESEARCH OR DEVELOPMENT

Not Applicable

REFERENCE TO A MICRO FICHE APPENDIX

Not Applicable

BACKGROUND OF INVENTION

Machine—human interactions have got more efficient over the last decade. However, while visual machine outputs have evolved substantially with user interfaces that mimic 2-d real world views, there has not been a corresponding advance in machine inputs for human interface. The background art describes a variety of input devices such as mice, joy sticks, and other hand and voice operated devices, however there is nothing in the background art that mimics the human interaction with the natural environment with vision and then extends it to what a virtual space can provide in terms of selectable points in the virtual scape.

Although input devices such as mice and joysticks have been very useful in many applications, the present invention departs from the prior art in providing unique new approach for man—machine interaction.

SUMMARY

In view of the prior art, it would be useful to have a device that can provide direct visual instruction to machines given visual stimuli using the information in the direction and depth of gaze as the motion of the eye lids which is closely related to ocular control by the brain. The present invention comprises such a device.

Objects & Advantages

Some of the objects and advantages of the present invention are that the visual stimuli from computers or other machines, can be directly responded to by the human user, with navigation to the point of interest and action by the eyes and the eyelids for quick interaction with computers and other machines with visual output. Yet another advantage is that the mental processing for interaction is reduced as there in no need for hand eye coordination or voice recognition but a direct use of the eyes and their appendages in feedback to the machine.

LIST OF REFERENCE NUMBERS

101—Reflector for virtual screen and eye projection to camera
102—Housing for camera and video projection unit
103—Microphone
104—Earphone
105—Controller unit—broadband wireless/video decompression/camera interpretation
106—Headband
107—video display
108—Eye
109—Eye appendages
110—Camera
111—Virtual Screen
112—3 Dimensional space
113—First human Response Observer
114—Second Human response Observer
115—Object of Gaze

DETAILED DESCRIPTION OF INVENTION

The quality of Man-machine interaction with a real time control device consisting of a machine stimulus generator and a human response observer, has improved sharply in the last two decades. Computer visual outputs (the "machine stimulus generator") have been made to mimic the natural stimuli that the human user has observed and has learned to respond to through a lifelong learning experience in interactions with the natural world. However, while machine inputs from the human user have developed substantially in the last two decades, there has remained a significant gap in the visual process of human command to the machine that has a counterpart in the natural world paradigm. In the natural visual interaction of the human with the real world, the human can view and select stimuli by navigating the eyes and the remaining anatomy appropriately. While body movements to this end are effective, the most economical in terms of mental processing is the movement of the eye and appendages—the Extended Eye (including the eye lids for removing and reinstating stimuli by closing and opening). The control of the eyes and the eyelids by the nervous system are closely related. Therefore the use of the eye and the eyelids in machine input results in much faster navigation and selection of stimuli due to the reduction of the mental processing required, the speed of accurate movement of the eye based on the natural visual selection process of stimuli presented in the field of view, and finally the ease of 3-dimensional navigation. The present invention meets this need. It comprises the machinery to process human eye (the "first human response observer") 113 and eye appendage movements (the "second human response observer") 114, to navigate and select stimuli as desired by the human user.

Some embodiments of the present invention may consist of one or more cameras 110 that monitor the eyes and the region around the eyes of the user in real time under ambient light conditions and/or infrared/visible supplementary light. Particular areas of interest for embodiments that monitor a single eye are the position of the pupil and cornea of the eye relative to the overall eye perimeter, the size of the pupil, the position of the eyelids. The monitoring of a single eye is adequate for navigation in a 2-dimensional space. However, when the field is extended to a three dimensional space 112 for navigation, it is necessary to have one or more cameras monitoring each of the two eyes in the stated manner. In addition the present invention has software algorithms and/ or hardware to assess the relative positions of the pupil and cornea of the eyes each with a reference to the fixed parts of the face or the perimeters of each of the eyes. This allows measurement of depth of focus ("D") of the eyes and will therefore be able to estimate the "zoom-in" and the "zoom-out" of the user as he/she navigates the virtual space stimuli of the machine visual interface. The cameras may be mounted to face the eye or in an alternative architecture utilize the mirror or partial mirror of a reflecting display system thereby allowing the mounting of the camera to face the reflecting mirror and in the vicinity of the light source of the display system.

There is extensive background art that supports the implementation of the present invention including the techniques and methods for object recognition and object tracking in machine vision and computer image processing literatures. There is in the present invention a calibration phase where the motion to be identified and recognized is defined. The object recognition and tracking algorithms are at this time set up with the required parameters for the specific users to the users preference. The algorithms are then able to estimate the likelihood of signals. Suitable filters (some defined below), whose implementation is available in the background art, are used to maximize the signal to noise ratio of the information that the cameras detect. Once a signal is created as the output from an object-tracking algorithm, it can be used very much like the signal in a computer mouse or in a computer joy-stick as an input signal.

The second human response observer in the present invention uses the motion of the eyelids in the wink or blink operation (of the left or right or both eyes) to signal events that the user wishes to transmit to the computer. (This may correspond to the click of a mouse button). There are a number of possible such events or signals such a single blink or wink of one eye (useful if both eyes are monitored) and of course multiple blinks or winks in quick succession. The timing and speed of these actions to be recognized by the present invention are adjustable by the user during a calibration process for the present invention defined below. (Single or multiple blink and wink signals may also be called "Vclicks" herein—a predefined ordered sequence of winks and blinks, with a predefined sequence of left eye blinks defined as Left Vclicks and a predefined sequence of right eye blinks defined as Right Vclicks and a predefined sequence of left and right eye blinks either together or in sequence being defined as Both Vclicks.).

Yet another feature of the present invention is the selection and deselection of the screen (on/off) with an object outside the screen or virtual screen (the "virtual display" that is located substantially orthogonal to the direction of vision and in front of the human subject. Here the user would visually select by looking at a predefined position outside the screen or virtual screen field of view and provide a predefined signal such as a Vclick to select or deselect the screen. This is particularly useful for headset screens that may be used part time only and are transparent within the field of view when not in use.

The cursor in some embodiments of the present invention is user definable to minimize the intrusion to the field of view. One such embodiment may have a point and a fine blinking circle. Moreover, during the calibration phase the user may select a suitable convention for cursor interaction as detailed below.

In the case of 2-dimensional navigation there is limited need for a two eye version of the present invention as the movement of a single eye is adequate for identifying the focus information of the user in 2 dimensions. Some embodiments of the present invention may use the convention of having the cursor following the gaze of the user. Selection signals are defined as single eye or double eye Vclicks. Yet other embodiments use another convention where the cursor does follow the gaze but where the cursor is selectable by a predefined Vclick sequence. For example is some embodiments a single Vclick could enable the cursor and a second Vclick after enabling it would select the object on the field of view. Further movement of the eyes in these embodiments will move the selected object as desired and when in the correct destination position the cursor may be deselected with a predetermined pattern of Vclicks. The cursor at this time could either follow the eye or be deselected to be reselected later.

In some embodiments the movement of the eye to the edge of the virtual screen/screen (the "virtual display") will activate a x-y scrolling signal that will scroll the screen further to the direction of the edge that the gaze of the user has reached. The gaze moving away from the above edge of the screen can stop scrolling.

3-Dimensional navigation in yet other embodiments of the present invention will in addition estimate the "depth of gaze" ("D") of the user to achieve zoom-scrolling. While it is well recognized that two-eye movement should be able to perceive depth the present invention defines for the first time, a practical approach to achieve this considering the process needed for 3-D navigation. Some of these embodiments use the relative focal direction of the two eyes (the "visual focal direction") each eye's focal direction being determined by the position of the pupil and/or the cornea relative to the periphery of the eye. In the case of a single (mono) image (the location of the stimulus) projected on both eyes, the user may "zoom-in" by relaxed gazing or relaxing the eyes to what is substantially infinite focal length—or a distant object of gaze. All that needs to be determined is that the eyes are focusing at a point behind the screen/virtual screen (the "virtual display"). This event in some embodiments of the present invention will zoom the field inwards as long as the focus of the gaze remains behind the screen/virtual screen. Notably the gaze of the user can be focused behind the screen/virtual screen (behind the principal projection plane of the virtual display) and still have a direction. Such a direction will be detected by the present invention to allow directional zooming in the direction of the gaze that the user chooses. As soon as the user focuses on the content of the screen, the zoom process slows to a standstill and remains at the standstill view of the image. The present invention may have a user settable time constant to the slowing down and speeding up of the zoom as the user changes his/her gaze from behind the screen/virtual screen (principal projection plane) to focus on the screen and vise versa. This time constant will enable the user to periodically check the distance he/she has navigated in the z-direction (zoom direction) and continue or stop the zoom.

A similar approach is used in some embodiments for zooming out. Here the depth of gaze is reduced by the user to stare at a point in front of the screen—say his her nose. The relative positions of the eyes that are estimated will inform the present invention that the eyes are focusing in front of the screen/virtual screen or principal projection plane, and the direction of the gaze, and will commence a zoom-out process in the direction of the gaze. Moreover, a similar approach may be adopted for the zoom-out as in the zoom-in, where the user may check the level of zoom out periodically by focusing on the screen/virtual screen, which will slow the zoom eventually to a standstill. The time constant for this transition as the user switches from the point of focus in front of the screen to the point of focus on the screen/virtual screen will determine the rate of slow down that is preferred by the user and may be set or modifies on a setup panel for this input device that is the present invention. In the case of stereo images projected to the two eyes and thereby generating a 3-dimensional virtual space, there will be greater resolution in direction for zoom movements, as the eyes will focus on the desired object—the object of gaze, at the depth plane desired and therefore have a depth of focus distance from the principal projection plane and an orthogonal position on the principal projection plane. Therefore the zoom process can target this point based on the relative direction of focus of the eyes. Other factors such as time constant for the zoom etc can follow the same design as in the mono-image case for two eye screens or a single screen for both eyes.

The actual algorithms for zooming in and out in virtual space may follow the extensive background art on such approaches for zooming and moving within 3-d virtual spaces as in video games. Open GL algorithms are one such source.

Yet another feature of the present invention is a set of filters that filter out natural behavior of the user that are not intended for interpretation by the present invention as events for input to the machine. Such filters in some embodiments of the present invention include a "neutral-gaze filter" which filters out the user's natural gaze while relaxing or thinking. This filter will be setup at calibration time by observing the user when relaxing or in thought and defines the set of possible relative and/or absolute eye positions that are encountered in this mental state. When the present invention is operational the cursor is temporarily deactivated when the user's gaze enters this set of possible gaze parameters. This temporary deactivation is cancelled when the gaze reverts to the plane of the screen/virtual screen. Here again some embodiments may have time constants to enter the natural gaze state and to get back into the active state at the end of the natural gaze period.

Yet another filter is the "natural blink filter". This is set up again at calibration time to observe the user and the eyelid movements of the user when not working with the machine. Once the present invention has observed the nature of movement in and the time pattern of the eye lids in natural blinks, these embodiments of the present invention at operation time will estimate the probability of an observed stimulus of a blink to be a signal or otherwise part of the natural blink pattern and accordingly use the signal as an input signal or not. The user may define patterns of blinks/winks that are clearly different from the natural pattern to increase the signal to noise ratio in this process and thereby improve the communication with the present invention as an input device. There is extensive background art in the literature in pattern recognition and signal processing that cover the basic algorithms that may be used to construct the present invention.

While some embodiments of the present invention will be mounted on headsets with screens/virtual screens, and thereby rigidly connected to the screens/virtual screens, they will need to estimate only the positions of the pupil/cornea relative to the perimeter of the eye. However, in embodiments that use fixed cameras and fixed screens/virtual screens, there is the additional need to estimate the position of the head as well and the eyes within the head. These embodiments use additional object and motion detection algorithms that process the camera signals from the face as well to produce the required input signals.

Figure 1:
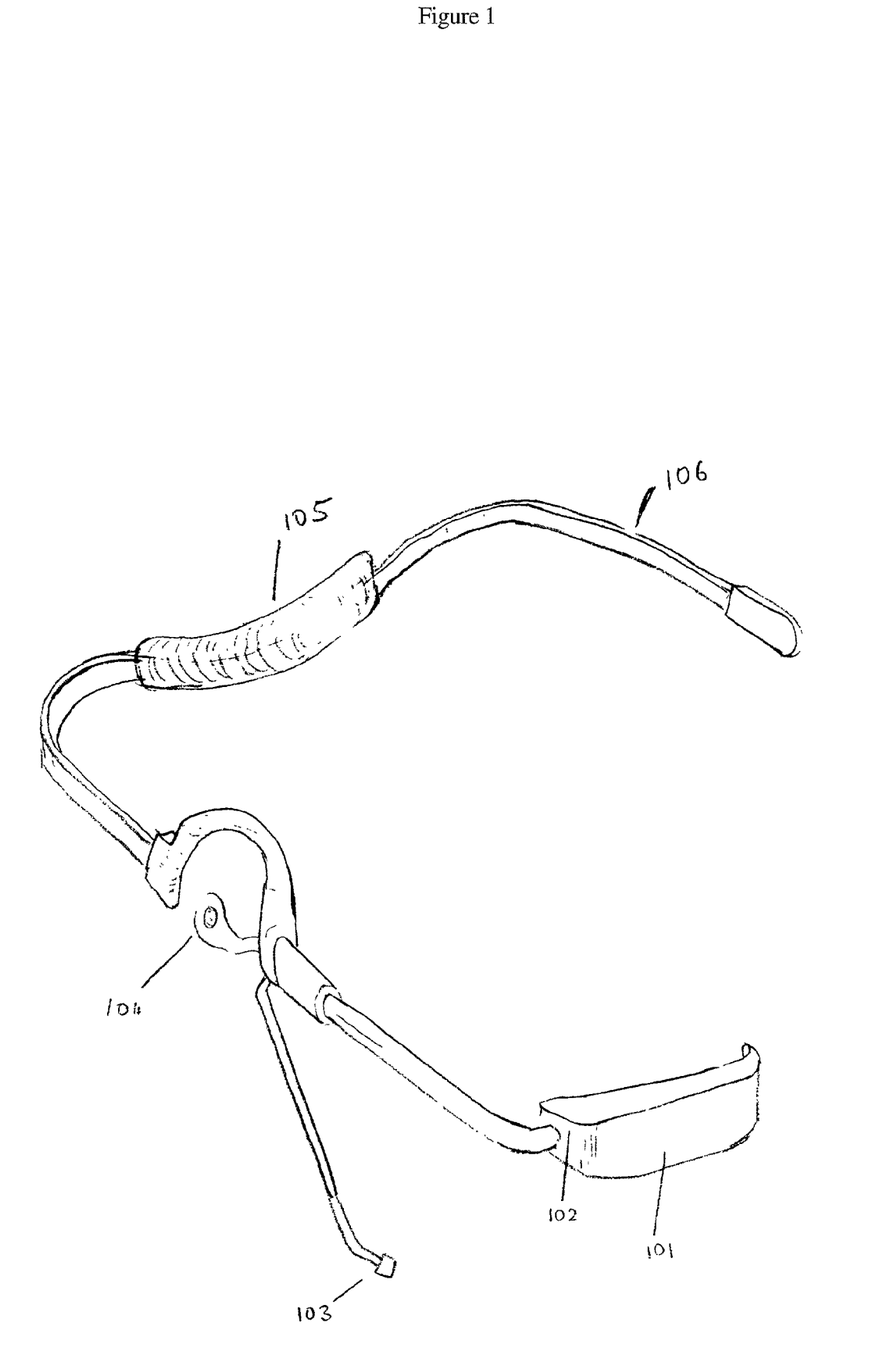
FIG. 1 illustrates an embodiment of the present invention that has a single eye camera and video display encased together with a reflective surface for projection to the eye. The controller unit rests at the back of the head. The embodiment has a microphone and an earphone.
Figure 2:
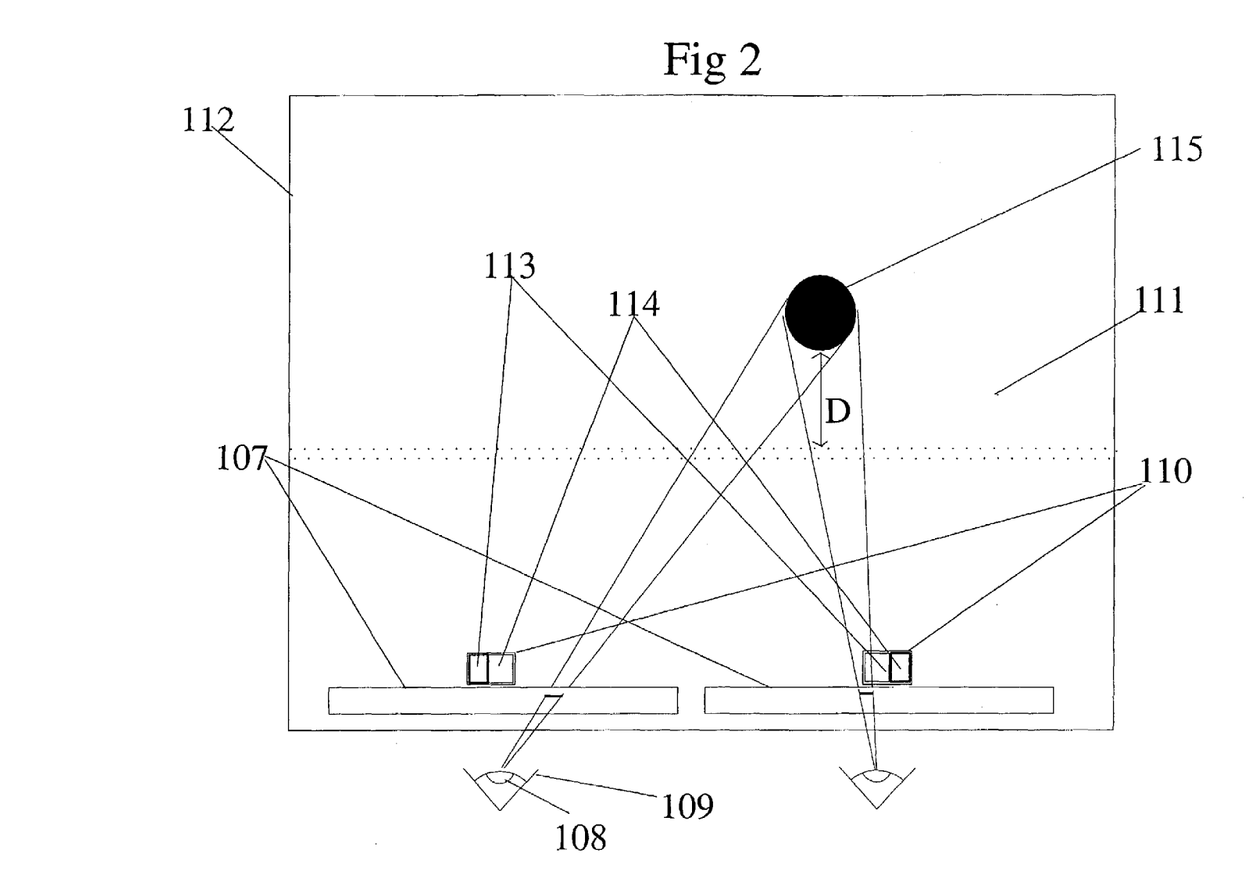
FIG. 2 illustrates an embodiment with a video display and a 3-dimensional virtual space.

In embodiments that use a headset, it will be normal to have a virtual or real headset mounted video display 107 (well covered in the background art) and for the purpose of voice recognition a microphone (well covered in the background art). These together will provide a powerful embodiment of the present invention that allows the user to navigate and command using the present invention and provide additional instruction to the computer using voice recognition, through the microphone.

A yet more powerful and convenient embodiment will use wireless communication technologies such as blue tooth and enhancements thereof in the future, to provide the video and audio signals to the headset, and to provide the channels to input commands from the present invention and the microphone to the computer.

Another aspect of the present invention is the visual field that is used for navigation in 3-dimensions, these may be natural spaces as perceived by the user as in video games that mimic natural scapes, or virtual spaces that are created for specific purposes. Some embodiments of the present invention may include one of the following virtual scapes as alternatives to natural scapes:

The switching space. In these embodiments the zoom or z-direction navigation "switches" from one plane to another in discrete steps. Each of these planes represents an application that is open on the machine, or an alternative view within an application, such as in a CAD program. It is therefore possible for the user to switch views by navigating forward or backwards. These embodiments may also have a circular arrangement of the planes so that navigation in one direction will circulate through all the available planes.

n-D virtual space: In these embodiments, navigation is within 3 dimensional space where objects are placed in the space using a convention for z-direction distribution as well as the usual x-y plane distribution. For example directory structures may first expand in the x direction then in the y direction and finally in the z direction to give a more intuitive tree structure in 3 dimensions. Such conventions can be made to be even more intuitive by making the synthetic space to be non-linear wherein the areas where the user is browsing is expanded and the remaining space is contracted to give a greater level of resolution in the region of interest of the user. Finally, n-dimensional spaces may be navigated by ordering them as a sequential set of nested 3-D spaces where the user can select points or nodes in each 3-D space to enter the next 3-D space. Selection and navigation can be effectively done in this environment by the present invention.

Finally the object recognition programs may include specific information about the user's eyes such as the iris or the retinal image that becomes a "signature" for logging into the system when the user commences use of the present invention.

The Calibration and set up of the present invention includes the learning process for the object recognition and motion detection algorithms using the user's data. The system will begin with default values and refine them to the characteristics of the user. This process will synthesize the actions or sets of actions of the user and map them into the desired actions of the user. Several of these actions are listed below. However the process of calibration may include other factors as well.

1. Neutral-Gaze filters are calibrated by the calibration program requesting the user to perform one or more gaze patterns that that (s)he performs when in thought or when (s)he wants to focus on other matters besides the video display. Once one or more of these gaze data sets are processed the parameters of these gaze patterns are maintained and compared with real time data from the user for actions as noted.

2. Blink pattern filters are calibrated by the calibration program requesting the user to simply use the present invention with no visual stimuli for a period of time. This can include several periods that the user is relaxed and focussed (as blink patterns could vary depending on mental conditions.). Once one or more of these blink data sets are processed the parameters of these blink patterns are maintained and compared with real time data to filter out this information in real time so that the signal to noise ratio of the data used to drive the input is raised by avoiding natural blink patterns being interpreted as Vclicks.

3. Gaze definition for Zoom-in and Zoom-out. Here the user inputs his/her preferred gaze sets for each of these interpreted inputs. Each of the zoom-ins and zoom-outs can have multiple directions and the user can define these to be the preferred gazes. Notably some embodiments of the present invention will flag up conflicts between the natural gaze and the chosen zoom out gazes so that the user may choose other zoom out gazes to minimize error in operation. Moreover, the Zoom-in and zoom-out will usually have time constants assigned to each of them so that when the user switches from focus on the screen to zoom and vise versa, the zooming of the field will slow and then stop giving the user time to focus periodically on the field of the screen while zooming in either direction. In the case of a stereo field of view, with two screens for each of the eyes, 3-D objects may be used in the calibration process for the eyes to focus on for the convergence measurements. This may be done at different depths at different locations in the x-y field.

4. The present invention needs to have a calibrated 2-d field of view so that movements in the eye can be interpreted as changes in the focus of the eye to different points on the screen/virtual screen. Therefore the calibration process includes stimuli that are places on the screen/virtual screen that the user looks at and the camera notes the position of the eyes and thereby maps the eye positions for each of the screen stimuli and thereby permits interpolation for estimating the exact focus of the eye from the position of the eye.

5. Vclicks need to be defined. The user may choose a set of several signals with winks and/or blinks to signal different input signals to the computer. (Very much like left, right and double clicks on the mouse). This is done at calibrate time.

6. The user may define the convention for selecting and deselecting the cursor when the present invention is in use. For example the one convention would be where the cursor follows the users gaze on the screen/virtual screen. In others the user is able to deselect the cursor with Vclicks and then reselect the cursor when desired again with Vclicks.

7. The user may define a position where he/she may look outside the screen/virtual screen and implement a Vclick to deactivate and reactivate the screen/virtual screen.

8. The user may define regions on the edge of the screen/virtual screen where a gaze would imply a command to scroll in the direction of the gaze.

Notably all the actions that are defined in the present invention may be implemented using algorithms that are currently in use for other input devices, in algorithms in the computer vision and image processing literature, in algorithms in the signal processing literature and in the stochastic control literature.

PREFERRED EMBODIMENT

The following is a detailed description of some of the components of this embodiment. The preferred embodiment of the present invention comprises a headset that has a single camera mounted besides a light source of a virtual screen, for a single eye virtual screen system. Both the camera and the light source are placed outside the field of view required of the virtual screen system. The reflective screen of the virtual screen system will also be reflective for light that falls on the eye and reflected back to the camera. The camera orientation will be such that it can "see" the eye and its immediate surroundings including the eyelids. The camera and the light source may be mounted in the same housing. The signals from the camera are conducted to a microprocessor system that analyses the data to provide the as output the inputs that will go into the computer. This microprocessor unit will need to be calibrated to the user for some of the functions as will the computer for others. Inputs to the video display and the outputs from the micro controller are conducted by wireless infrastructure such as Blue tooth or extensions thereof to relevant computer input port.

ADDITIONAL EMBODIMENTS

Additional embodiments to the preferred embodiment have a two-eye system with the virtual screen system duplicated and each of the two eyes monitored for movement. The microprocessor system will take as inputs the signals from both cameras and output in addition, the gaze depths as required for 3-d browsing. The microprocessor system will also interpolate the inputs from the two cameras to better estimate the direction of focus of the user on the virtual screen.

Another additional embodiment has microphone and earphones as well to provide a complete interface for the computer system.

The microprocessor based controller may be mounted on the headset preferably on the headband that bends down to the base of the skull, so that the weight of the module may be supported at that point largely by the neck. In this single eye embodiment the headband extends only to behind the ear opposite the ear with an earpiece and the side where the display and camera are mounted. Whereas in the double eye embodiment there are two display booms that include the camera extending from the earpieces. The microphone boom extends from the earpiece of the headset, as is the common design. In both cases the headset may rest on the top of the ears and the base of the skull, on the neck.

ALTERNATIVE EMBODIMENTS

In an alternative embodiment to the preferred embodiment, the cameras that are used to record and interpret movement of the eye and eye region are mounted on the outer side of the field of view of the user, pointing directly at the eye, rather than use the reflective properties of a virtual screen to get the image of the eye as in the preferred embodiment.

In another alternative embodiment the headset is connected by wires with the required input and output signals rather than use a wireless communication system.

In yet another embodiment, there is more than one camera viewing each of the eyes, so that the calibration of the field of view can be made more accurate by using interpolations of the two or more camera readings.

In yet another embodiment, the present invention comprises a screen/virtual screen and the cameras along with possibly the headphones and microphone. The signals from the camera are sent to the computer for preprocessing with appropriate drivers and subsequent interpretation as commands for the computer applications.

In yet another alternative embodiment, the camera is mounted on a fixed screen facing the user. The camera input includes the eye positions and also the face of the user. The object recognition and motion detection algorithms will track both the facial movements as well as the eye movements to estimate the direction of focus of the user. In an alterative embodiment to this embodiment for z-direction movement as well, two cameras are placed spacially separated in a horizontal direction at about the plane of the screen and together estimate the gaze depth as well for input to the computer.

CONCLUSIONS, RAMIFICATIONS & SCOPE

Thus it will become apparent that the present invention presented, provides a new and unique approach for human interaction with machines, by creating an intuitive input to the machines that relate closely with the natural response of the human in processing visual information that will result is fast man machine communication.

The invention claimed is:

1. A real time control device for a machine by a human, wherein said control device comprises a machine stimulus generator that stimulates elements of said human, and a human response observer that observes observable human responses to stimuli generated by said machine stimulus generator,
    wherein said machine stimulus generator is a video display device having a video display for one or each of both eyes of said human, and wherein said human response observer comprises a first human response observer element and a second human response observer element,
    wherein said first human response observer element observes one or each of both eye balls relative to said one or respectively each of both of said video displays thereby enabling said first human response observer element to observe a visual focal direction of one or each of both eyes of said human, thereby determining through computation and prior calibration, the visual focal direction of one or each of both eyes with regard to locations of a stimulus on said one or each of both video displays—an object of gaze of said human,
    and wherein said second human response observer element observes motion of human response elements consisting of movement of one or both eyelids, which comprise a predefined set of patterns of Vclicks from one or both eyes, wherein each of said Vclicks consists of a single blink sequence of at least one blink, of one of the left eye defined as a Left Vclick or of the right eye defined as a Right Vclick or a combination of blinks of both eyes together or separately defined as a Both Vclick, and said predefined set of Vclicks constitute a Vclick Set,
    and furthermore wherein said observable human response comprise a predefined combination of said object of gaze of said one or each of both eyes as observed by said first human response observer element and at least one element of said Vclick Set observed by said second human response observer element substantially concurrently,
    said real time control device further comprising a plurality of distinct controllable cursors on said display device each having a distinct function, and each separately controllable by said human, said separate control comprising the object of gaze of one or each of both eyes of said human and separate and distinct predefined Vclick sequences of the human observed by said control device, thereby permitting said human to control a selection, deselection and movement of each of said one or more cursors.

2. A control device as in claim 1, wherein each of said cursors are controlled by one or more elements of a unique sequence of first, second, third and fourth Vclick sequences, unique to each of said cursors, and wherein each of said cursors is selectable by a first predefined Vclick sequence after which said cursor moves with said gaze of said human, and wherein said cursor attaches to object of gaze on said display device by a second predefined Vclick sequence, and wherein said cursor detaches from said object of gaze by a third predefined Vclick sequence, and wherein said cursor detaches from gaze of the human by a fourth predefined Vclick sequence, thereby manipulating objects on the display device with one or more operations each corresponding to each of said cursors.

3. A real time control device for a machine by a human, wherein said control device comprises a machine stimulus generator that stimulates elements of said human and a human response observer that observes observable human responses to stimuli generated by said machine stimulus generator and thereby provides control to said machine,
    wherein said machine stimulus generator is a pair of video displays for each of both eyes, wherein each of said pair of video displays presents separate and distinct stimuli to each of the two eyes of said human, thereby projecting a virtual space of three dimensions containing 3 dimensional stimuli generated by said machine, said virtual space further containing in its interior, a principal projection plane substantially orthogonal to the eyes of said human, and wherein said principal projection plane has a center, wherein a depth of focus (D) of an object of gaze is measured by said human response observer from said principal projection plane, and
    wherein said video display device comprises a zoom feature, wherein if said object of gaze lies at a greater distance than predefined distances either in front of, or behind said principal projection plane, each of said video displays zoom stimuli on said video displays in a direction that brings said object of gaze in said virtual space towards said principal projection plane in a direction orthogonal to the principal projection plane.

4. A control device as in claim 3, wherein, said zoom feature comprise one or more time constants that determines a rate of zoom in a direction orthogonal to the principal projection plane.

5. A real time control device for a machine by a human, wherein said control device comprises a machine stimulus generator that stimulates elements of said human and a human response observer that observes observable human responses to stimuli generated by said machine stimulus generator and thereby provides control to said machine,
    wherein said machine stimulus generator is a pair of video displays for each of both eyes, wherein each of said pair of video displays presents separate and distinct stimuli to each of the two eyes of said human, thereby projecting a virtual space of three dimensions containing 3 dimensional stimuli generated by said machine, said virtual space further containing in its interior, a principal projection plane substantially orthogonal to the eyes of said human, and wherein said principal projection plane has a center, wherein a depth of focus (D) of an object of gaze is measured by said human response observer from said principal projection plane, and wherein said visual display device comprises a zoom-scroll feature, wherein if said object of gaze lies in a predefined direction from the center of the principal projection plane at a greater distance than a predefined distance from the center of said principal projection plane, said visual displays zoom-scroll stimuli on said visual displays in a direction that brings said object of gaze towards said center of the principal projection plane.

6. A real time control device for a machine by a human, wherein said control device consists of a machine stimulus generator and a human response observer, wherein said machine stimulus generator is a video display for each of both eyes, said video displays projecting with distinct images in a three dimensional virtual space having a principal projection plane, and wherein said human response observer observes, movements of human response elements consisting of each of both eye balls that orient direction of gaze of each of both of said eye balls, relative to their respective video displays, thereby enabling said human response observer to observe a visual focal direction of each of both eyes of said human, thereby determining through computation and prior calibration an object of gaze behind, on or in front of said principal projection plane, and a location of said object of gaze in a plane parallel to said principal projection plane, said control device further comprising an x-y-scroll feature, wherein for each object of gaze, that said human chooses to view, said human response observer computes a distance of said location from a center of said principal projection plane and scrolls said stimulus towards the center of the principal projection plane if distance of said location is greater than a predetermined distance in a predetermined direction.

7. A real time control device for a machine by a human, wherein said control device consists of a machine stimulus generator and a human response observer, wherein said machine stimulus generator is a video display device having a video display for one or each of both eyes of said human, and wherein said human response observer observes, movements of human response elements consisting of one or both eye balls that orient direction of gaze of one or each of both of said eye balls, relative to said one or respectively both video displays, thereby determining through computation and prior calibration of a visual focal direction of one or each of both eyes with locations of stimuli on one or each of both visual displays respectively, an object of gaze of said human, said human response observer further comprising Gaze Filters, that analyze real time movement patterns in said object of gaze and by comparisons of such patterns with observations of said movement patterns in said objects of gaze as determined from the focal direction of the eye balls at times when no visual stimuli are presented on the visual display device, remove from consideration as human response, movement patterns in computed objects of gaze that are thereby estimated to be patterns unrelated to visual stimuli on said visual displays, thereby targeting intentional focus of user on objects of gaze and increasing the related signal to noise ratio.

8. A real time control device for a machine by a human, wherein said control device comprises a machine stimulus generator that stimulates elements of said human, and a human response observer that observes observable human responses to stimuli generated by said machine stimulus generator, wherein said machine stimulus generator is a video display device having a video display for one or each of both eyes of said human, and wherein said human response observer comprises a first human response observer element and a second human response observer element, wherein said first human response observer element observes one or each of both eye balls relative to said one or respectively each of both of said video displays thereby enabling said first human response observer element to observe a visual focal direction of one or each of both eyes of said human, thereby determining through computation and prior calibration, the visual focal direction of one or each of both eyes with regard to locations of a stimulus on said one or each of both video displays—an object of gaze of said human, and wherein said second human response observer element observes motion of human response elements consisting of movement of one or both eyelids, which comprise a predefined set of patterns of Vclicks from one or both eyes, wherein each of said Vclicks consists of a single blink sequence of at least one blink, of one of the left eye defined as a Left Vclick or of the right eye defined as a Right Vclick or a combination of blinks of both eyes together or separately defined as a Both Vclick, and said predefined set of Vclicks constitute a Vclick Set, and furthermore wherein said observable human response comprise a predefined combination of said object of gaze of said one or each of both eyes as observed by said first human response observer element and at least one element of said Vclick Set observed by said second human response observer element substantially concurrently and said control device further comprising Blink Filters, that analyze real time blink patterns of said human, and compare it with blink patterns at other prior times during and before a projection of visual stimuli, thereby removing blink patterns that are natural to the human and unintended for interpretation by said control device resulting in higher signal to noise ratios in performance of said control device.

9. A real time control device for a machine by a human, wherein said control device comprises a machine stimulus generator that stimulates elements of said human and a human response observer that observes observable human responses to stimuli generated by said machine stimulus generator and thereby provides control to said machine, wherein said machine stimulus generator is a pair of video displays for each of both eyes, wherein each of said pair of video displays presents separate and distinct stimuli to each of the two eyes of said human, thereby projecting a virtual space of three dimensions containing 3 dimensional stimuli generated by said machine, said virtual space further containing in its interior, a principal projection plane substantially orthogonal to the eyes of said human, and wherein said principal projection plane has a center, wherein a depth of focus (D) of an object of gaze is measured by said human response observer from said principal projection plane, and wherein said video display device comprises a zoom feature, wherein if said object of gaze lies at a greater distance than predefined distances either in front of, or behind said principal projection plane, each of said video displays zoom stimuli on said video displays in a direction that brings said object of gaze in said virtual space towards said principal projection plane in a direction orthogonal to the principal projection plane and wherein said human response observer further comprises mean to observe movement of eyelids, said movement of eyelids comprising a predefined set of patterns of Vclicks from one or both eyes, wherein each of said Vclicks consists of a single blink sequence of at least one blink, of one of a left eye defined as a Left Vclick or of a right eye defined as a Right Vclick or a combination of blinks of both eyes together or separately defined as a Both Vclick, and said predefined set of Vclicks constitute a Vclick Set, thereby enabling said real time control to be effected by a predefined combination of said object of gaze and of at least one element of said Vclick Set and, wherein said virtual space consists of a plurality of planes parallel to said principal projection plane, each of said plurality of parallel planes representing a separate application on said machine requiring human interaction, and wherein objects of gaze are selectable with Vclick combination and wherein if said object of gaze lies substantially on one of said parallel planes and said parallel plane is selected by a Vclick combination said parallel plane zooms to said principal plane, thereby allowing navigation among said parallel planes with zooming but allowing interaction with only one plane at a time by said human.

10. A real time control device for a machine by a human, wherein said control device comprises a machine stimulus generator that stimulates elements of said human, and a human response observer that observes observable human responses to stimuli generated by said machine stimulus generator, wherein said machine stimulus generator is a video display device having a video display for one or each of both eyes of said human, and wherein said human response observer comprises a first human response observer element and a second human response observer element, wherein said first human response observer element observes one or each of both eye balls relative to said one or respectively each of both of said video displays thereby enabling said first human response observer element to observe a visual focal direction of one or each of both eyes of said human, thereby determining through computation and prior calibration, the visual focal direction of one or each of both eyes with regard to locations of a stimulus on said one or each of both video displays—an object of gaze of said human, and wherein said second human response observer element observes motion of human response elements consisting of movement of one or both eyelids, which comprise a predefined set of patterns of Vclicks from one or both eyes, wherein each of said Vclicks consists of a single blink sequence of at least one blink, of one of the left eye defined as a Left Vclick or of the right eye defined as a Right Vclick or a combination of blinks of both eyes together or separately defined as a Both Vclick, and said predefined set of Vclicks constitute a Vclick Set, and furthermore wherein said observable human response comprise a predefined combination of said object of gaze of said one or each of both eyes as observed by said first human response observer element and at least one element of said Vclick Set observed by said second human response observer element substantially concurrently and, wherein said blinks are each elements of a plurality of distinct blinks each with a predefined blink duration constituting a blink duration set.

11. A real time control device for a machine by a human, wherein said control device comprises a machine stimulus generator that stimulates elements of said human and a human response observer that observers observable human responses to stimuli generated by said machine stimulus generator and thereby provides control to said machine, wherein said machine stimulus generator is a pair of video displays for each of both eyes, wherein each of said pair of video displays presents separate and distinct stimuli to each of the two eyes of said human, thereby projecting a virtual space of three dimensions containing 3 dimensional stimuli generated by said machine, said virtual space further containing in its interior, a principal projection plane substantially orthogonal to the eyes of said human, and wherein said principal projection plane has a center, wherein a depth of focus (D) of an object of gaze is measured by said human response observer from said principal projection plane and wherein said human response observer further comprises mean to observe movement of eyelids, said movement of eyelids comprising a predefined set of patterns of Vclicks from one or both eyes, wherein each of said Vclicks consists of a single blink sequence of at least one blink, of one of a left eye defined as a Left Vclick or of a right eye defined as a Right Vclick or a combination of blinks of both eyes together or separately defined as a Both Vclick, and said predefined set of Vclicks constitute of Vclick Set, thereby enabling said real time control to be effected by a predefined combination of said object of gaze and of at least one element of said Vclick Set said real time control device, further comprising a plurality of distinct controllable cursors in said 3-dimensional virtual space each having a distinct function, and each separately controllable by said human, said separate control comprising distinct predefined Vclick sequences, thereby permitting said human to control a selection, deselection and movement of each of said one or more cursors.

12. A control device as in claim 11, wherein each of said cursors are controlled by one or more elements of a unique sequence of first, second, third and fourth Vclick sequences, unique to each of said cursors, and wherein each of said cursors is selectable by a first predefined Vclick sequence after which said cursor moves with said gaze of said human, and wherein said cursor attaches to object of gaze on said display device by a second predefined Vclick sequence, and wherein said cursor detaches from said object of gaze by a third predefined Vclick sequence, and wherein said cursor detaches from gaze of the human by a fourth predefined Vclick sequence, thereby manipulating objects in the virtual space with one or more operations each corresponding to each of said cursors.

13. A real time control device for a machine by a human, wherein said control device comprises a machine stimulus generator that stimulates elements of said human, and a human response observer that observes observable human responses to stimuli generated by said machine stimulus generator,
- wherein said machine stimulus generator is a video display device having a video display for one or each of both eyes of said human, and wherein said human response observer comprises a first human response observer element and a second human response observer element,
- wherein said first human response observer element observes one or each of both eye balls relative to said one or respectively each of both of said video displays thereby enabling said first human response observer element to observe a visual focal direction of one or each of both eyes of said human, thereby determining through computation and prior calibration, the visual focal direction of one or each of both eyes with regard to locations of a stimulus on said one or each of both video displays—an object of gaze of said human,
- and wherein said second human response observer element observes motion of human response elements consisting of movement of one or both eyelids, which comprise a predefined set of patterns of Vclicks from one or both eyes, wherein each of said Vclicks consists of a single blink sequence of at least one blink, of one of the left eye defined as a Left Vclick or of the right eye defined as a Right Vclick or a combination of blinks of both eyes together or separately defined as a Both Vclick, and said predefined set of Vclicks constitute a Vclick Set,
- and furthermore wherein said observable human response comprise a predefined combination of said object of gaze of said one or each of both eyes as observed by said first human response observer element and at least one element of said Vclick Set observed by said second human response observer element substantially concurrently and said real time control device, further comprising a zoom-scroll feature wherein said first human response observer element observes a focal distance of said one or each of both eyes, and determines a condition for zoom-in when a measured focal distance of at least one eye is greater than a predetermined distance, and wherein said machine stimulus generator zooms in when said measured focal distance of at least one eye is greater than a predetermined distance is met.

14. A real time control device for a machine by a human, wherein said control device comprises a machine stimulus generator that stimulates elements of said human, and a human response observer that observes observable human responses to stimuli generated by said machine stimulus generator,
- wherein said machine stimulus generator is a video display device having a video display for one or each of both eyes of said human, and wherein said human response observer comprises a first human response observer element and a second human response observer element,
- wherein said first human response observer element observes one or each of both eye balls relative to said one or respectively each of both of said video displays thereby enabling said first human response observer element to observe a visual focal direction of one or each of both eyes of said human, thereby determining through computation and prior calibration, the visual focal direction of one or each of both eyes with regard to locations of a stimulus on said one or each of both video displays—an object of gaze of said human,
- and wherein said second human response observer element observes motion of human response elements consisting of movement of one or both eyelids, which comprise a predefined set of patterns of Vclicks from one or both eyes, wherein each of said Vclicks consists of a single blink sequence of at least one blink, of one of the left eye defined as a Left Vclick or of the right eye defined as a Right Vclick or a combination of blinks of both eyes together or separately defined as a Both Vclick, and said predefined set of Vclicks constitute a Vclick Set,
- and furthermore wherein said observable human response comprise a predefined combination of said object of gaze of said one or each of both eyes as observed by said first human response observer element and at least one element of said Vclick Set observed by said second human response observer element substantially concurrently, said real time control device, further comprising a zoom-scroll feature wherein said first human response observer element observes a focal distance of said one or each of both eyes, and determines a condition for zoom-out when a human looks at the region in the vicinity of said human's nose, and wherein said machine stimulus generator zooms in when said condition is met.

15. A real time control device for a machine by a human, wherein said control device comprises a machine stimulus generator that stimulates elements of said human, and a human response observer that observes observable human responses to stimuli generated by said machine stimulus generator,
- wherein said machine stimulus generator is a video display device having a video display for one or each of both eyes of said human, and wherein said human response observer comprises a first human response observer element and a second human response observer element,
- wherein said first human response observer element observes one or each of both eye balls relative to said one or respectively each of both of said video displays thereby enabling said first human response observer element to observe a visual focal direction of one or each of both eyes of said human, thereby determining through computation and prior calibration, the visual focal direction of one or each of both eyes with regard to locations of a stimulus on said one or each of both video displays—an object of gaze of said human,
- and wherein said second human response observer element observes motion of human response elements consisting of movement of one or both eyelids, which comprise a predefined set of patterns of Vclicks from one or both eyes, wherein each of said Vclicks consists of a single blink sequence of at least one blink, of one of the left eye defined as a Left Vclick or of the right eye defined as a Right Vclick or a combination of blinks of both eyes together or separately defined as a Both Vclick, and said predefined set of Vclicks constitute a Vclick Set,
- and furthermore wherein said observable human response comprise a predefined combination of said object of gaze of said one or each of both eyes as observed by said first human response observer element and at least one element of said Vclick Set observed by said second human response observer element substantially concurrently, said real time control device, further comprising a plurality of distinct controllable cursors on said display device each having a distinct function, and each separately controllable by said human, said separate control comprising the object of gaze of one or each of both eyes of said human and separate and distinct predefined Vclick sequences of the human observed by said control device, thereby permitting said human to control a selection, deselection and movement of each of said one or more cursors.

16. A control device as in claim 15, wherein each of said cursors are controlled by one or more elements of a unique sequence of first, second, third and fourth Vclick sequences, unique to each of said cursors, and wherein each of said cursors is selectable by a first predefined Vclick sequence after which said cursor moves with said gaze of said human, and wherein said cursor attaches to object of gaze on said display device by a second predefined Vclick sequence, and wherein said cursor detaches from said object of gaze by a third predefined Vclick sequence, and wherein said cursor detaches from gaze of the human by a fourth predefined Vclick sequence, thereby manupilating objects on the display device with one or more operations each corresponding to each of said cursors.

* * * * *